(12) United States Patent
Kanda et al.

(10) Patent No.: US 8,939,113 B2
(45) Date of Patent: Jan. 27, 2015

(54) VARIABLE VALVE TIMING CONTROLLER

(75) Inventors: Tsuyoshi Kanda, Okazaki (JP); Masao Kurisu, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/461,290

(22) Filed: May 1, 2012

(65) Prior Publication Data

US 2012/0291722 A1   Nov. 22, 2012

(30) Foreign Application Priority Data

May 18, 2011   (JP) ................... 2011-111248

(51) Int. Cl.
| | | |
|---|---|---|
| *F01P 9/02* | (2006.01) | |
| *F02D 13/02* | (2006.01) | |
| *F02D 13/08* | (2006.01) | |
| *F01L 1/352* | (2006.01) | |
| *F01P 3/02* | (2006.01) | |
| *F01P 3/22* | (2006.01) | |
| *F01P 3/18* | (2006.01) | |

(52) U.S. Cl.
CPC ............ *F02D 13/0238* (2013.01); *F02D 13/08* (2013.01); *F01L 1/352* (2013.01); *F01P 3/02* (2013.01); *F01P 2003/2278* (2013.01); *F01P 3/18* (2013.01); *F01P 3/22* (2013.01); *F01P 3/2285* (2013.01); *F02D 2013/0292* (2013.01); *F01L 2201/00* (2013.01); *F01L 2800/01* (2013.01); *F01L 2800/03* (2013.01); *F01L 2820/032* (2013.01); *Y02T 10/18* (2013.01)
USPC ...................................................... 123/41.2

(58) Field of Classification Search
CPC ....... F01P 3/22; F01P 2003/2278; F01P 3/02; F01P 3/18; F01P 3/2285
USPC .......................................................... 123/41.2
See application file for complete search history.

(56) References Cited

U.S. PATENT DOCUMENTS

| | | | | |
|---|---|---|---|---|
| 5,816,204 | A * | 10/1998 | Moriya et al. ............. | 123/90.17 |
| 6,330,870 | B1 * | 12/2001 | Inoue et al. ................ | 123/90.17 |
| 6,948,464 | B2 * | 9/2005 | Ido et al. .................... | 123/90.15 |
| 2005/0098131 | A1 * | 5/2005 | Hirowatari et al. ........ | 123/90.17 |
| 2005/0205029 | A1 * | 9/2005 | Takemura et al. ......... | 123/90.15 |
| 2007/0175427 | A1 * | 8/2007 | Inoue et al. ................ | 123/90.17 |
| 2007/0221150 | A1 | 9/2007 | Inoue et al. | |
| 2008/0257292 | A1 * | 10/2008 | Inoue ......................... | 123/90.17 |
| 2009/0007864 | A1 * | 1/2009 | Kanafani et al. ........... | 123/90.15 |

(Continued)

FOREIGN PATENT DOCUMENTS

JP   2009-141995   6/2009

OTHER PUBLICATIONS

Office Action (1 page) dated Apr. 30, 2013, issued in corresponding Japanese Application No. 2011-111248 and English translation (2 pages).

*Primary Examiner* — Lindsay Low
*Assistant Examiner* — Charles Brauch
(74) *Attorney, Agent, or Firm* — Nixon & Vanderhye P.C.

(57) ABSTRACT

An engine is provided with a variable valve timing device which transmits a rotational force generated by a motor via a motor drive circuit to a cam shaft so as to change a rotational phase of the cam shaft relative to a crank shaft. An ECU cools a motor and a motor drive circuit when the change of the rotational phase stops during the changing of the rotational phase of the cam shaft to a target value is detected. In addition, the lock state is eliminated by driving the motor by the motor drive circuit after cooling the motor device.

6 Claims, 6 Drawing Sheets

(56) References Cited

U.S. PATENT DOCUMENTS

| | | | |
|---|---|---|---|
| 2009/0020084 A1* | 1/2009 | Shikata et al. | 123/90.17 |
| 2009/0228187 A1* | 9/2009 | Nakamura | 701/103 |
| 2010/0139591 A1* | 6/2010 | Nakamura | 123/90.16 |
| 2011/0061619 A1* | 3/2011 | Urushihata | 123/90.17 |
| 2011/0100312 A1 | 5/2011 | Hirata | |

* cited by examiner

US 8,939,113 B2

VARIABLE VALVE TIMING CONTROLLER

CROSS-REFERENCE TO RELATED APPLICATION

This application is based on Japanese Patent Application No. 2011-111248 filed on May 18, 2011, the disclosure of which is incorporated herein by reference.

TECHNICAL FIELD

The present invention relates to a variable valve timing controller for an internal combustion engine, and in detail, to a variable valve timing controller for an internal combustion engine which changes valve timing by power supply control to a motor.

BACKGROUND

There is conventionally known an electrically-operated type of variable valve timing device which changes a rotational phase of a cam shaft relative to a crank shaft for an internal combustion engine to change opening/closing timing (valve timing) of an intake valve or an exhaust valve. There are proposed a variety of methods for controlling this device (US-2007-0221150A1). In the controller disclosed in US-2007-0221150A1, in a case of changing the valve timing at the stopping of an internal combustion engine, an operational amount of the motor is made smaller than during the operating of the internal combustion engine. In this manner, an operating noise of the variable valve timing device is reduced.

In a case of changing the valve timing after stopping the internal combustion engine, it is required to transfer the cam shaft from a stop state to a rotation state. Specially, for example, in a case where a rotation transmission portion in the variable valve timing device to the cam shaft comprises a plurality of gears, it is required that the gears in the rotation transmission portion are rotated from the stop state by the motor, thereby to change the rotational phase of the cam shaft. There exists an individual difference in dimension between the gears of the rotation transmission portion. Therefore there is a possibility that, caused by a difference in an engaging state of the gears or the like due to the individual difference, the change in the rotational phase of the cam shaft relative to the crank shaft is stopped in the middle of changing the valve timing after the stop of the internal combustion engine. That is, there is a possibility that there occurs a state (lock state) where the cam shaft can not be further rotated.

In a case where this lock state occurs, when the power supply to the motor is continued, there is a possibility that a temperature of the motor or a motor drive circuit for driving the motor rises. In a case where this temperature rise occurs, there is a possibility that the motor or the motor drive circuit is not appropriately operated. As a result, for example, even if power supply control is performed for releasing the lock state at the lock occurrence, the lock state can not be eliminated.

SUMMARY

It is an object of the present disclosure to provide a variable valve timing controller which can appropriately control valve timing for an internal combustion engine.

A variable valve timing controller is applied to a variable valve timing device provided with a motor device including a motor and a motor drive circuit for supplying power to the motor for a drive. A rotational force generated by the motor is transmitted to a cam shaft for an internal combustion engine, and a rotational phase of the cam shaft relative to a crank shaft for the internal combustion engine is changed by the rotational force.

The variable valve timing controller includes: a first power supply control portion performing a first power supply control for controlling the rotational phase to a target value by driving the motor by the motor drive circuit; a lock detecting portion detecting occurrence of a lock state where the change of the rotational phase substantially stops during the changing of the rotational phase to the target value by the first power supply controlling portion; a cooling control portion cooling the motor device in a case where it is detected that the lock state occurs by the lock detecting means; and a second power supply control portion performing a second power supply control for eliminating the lock state by driving the motor by the motor drive circuit after cooling the motor device by the cooling control portion.

A rotational force transmission portion of a variable valve timing device has a portion where a force transmission is easily performed and a portion where a force transmission is not easily performed. Thus, when varying the rotational phase of the cam shaft relative to a crank shaft, it is likely that a load for rotating the cam shaft may be temporarily increased. Particularly, in a case of changing the rotational phase of the cam shaft after stopping the internal combustion engine, since it is required to perform the rotation of the cam shaft from the stop state, the load for the rotation of the cam shaft becomes larger. Therefore, it is likely that the rotational force becomes insufficient in a case where the load for the rotation of the cam shaft temporarily increases, and as a result, it is likely that a lock state of the cam shaft may occur. In view of the above, when a lock state is detected, a power supply control to a motor (second power supply control) is conducted to eliminate the lock state.

Immediately after the engine is stopped, a temperature of the motor and its vicinity is relatively high. In addition, the motor has characteristics depending on temperature. A torque outputted from the motor decreases at a high temperature of the motor. Therefore in a state of the lock occurrence in the cam shaft, there is a possibility that the lock release can not be appropriately achieved by the second power supply control. That is, in a state where the lock does not occur, the motor torque is not required so much for changing the rotational phase of the cam shaft, but at the occurrence of the lock state, the larger motor torque is required for the lock release. Therefore when the motor is at a high temperature, the motor torque required for the lock release can not be possibly obtained.

Even at the lock state occurrence in the variable valve timing device, it is likely that a lock power supply may be performed and a temperature of the motor device (motor or motor drive circuit) rises by the lock power supply. In this case, as the motor temperature becomes higher, the motor torque is more decreased. In consequence, it is likely that the lock state can not be eliminated by the second power supply control or a failure of the motor drive circuit is caused due to an excessive rise in temperature of the motor drive circuit. In view of the above, according to the present disclosure, in a case where the lock state of the variable valve timing device occurs, the temperature of the motor device is lowered by performing a motor cooling control for cooling the motor device. Further, in a state where the temperature of the motor device is lowered, a second power supply control is performed for eliminating the lock state of the variable valve timing device. Thereby, it can be avoided that the motor torque is decreased or the motor drive circuit has malfunctions, and the lock state of the cam shaft can be certainly eliminated by the second power supply control. The valve timing for the internal combustion engine can be appropriately controlled.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

[First Embodiment]

Hereinafter, a first embodiment that embodies the present invention will be described with reference to the drawings. In the present embodiment, a valve timing control system is established with respect to an intake valve of an internal combustion engine. A valve timing control is performed by an electronic control unit (hereinafter, ECU).

Figure 1:
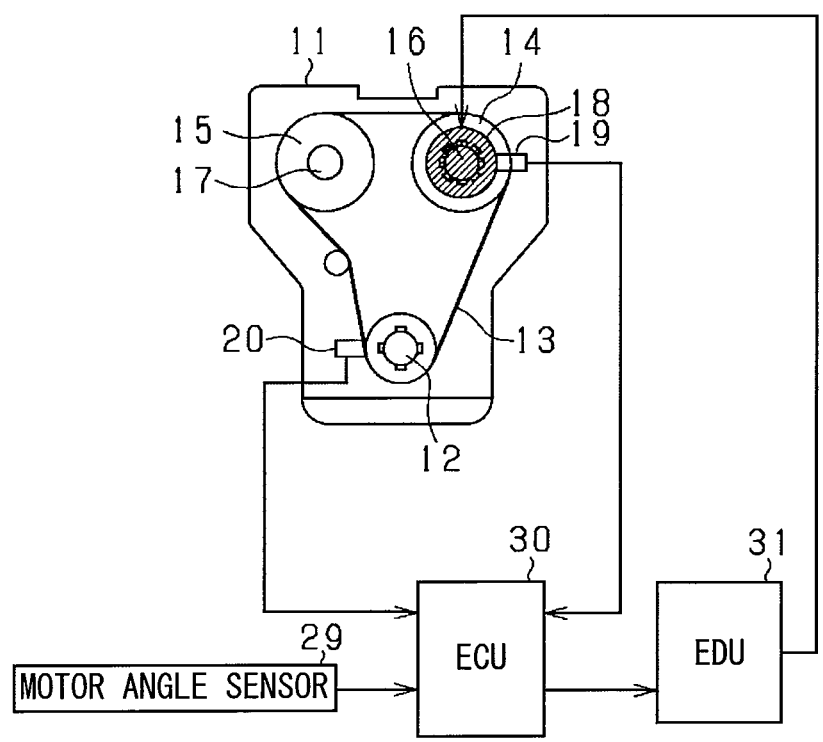
FIG. 1 is a construction diagram showing an entire outline of a valve timing control system to which embodiments of the present invention are applied.

FIG. 1 shows an entirely schematic construction diagram of the control system. In an engine 11, a crank shaft 12 of the engine 11 is coupled via a timing chain (or timing belt) 13 to a sprocket 14 of an intake-side cam shaft 16 and a sprocket 15 of an exhaust-side cam shaft 17. Therefore power of the engine 11 is transmitted via the timing chain 13 and the sprockets 14 and 15 to the intake-side cam shaft 16 and the exhaust-side cam shaft 17. When the crank shaft 12 is rotated by the driving of the engine 11, the intake-side cam shaft 16 and the exhaust-side cam shaft 17 rotate with the rotation of the crank shaft 12, and cams (not shown) mounted on the cam shafts 16 and 17 also rotate. With the rotation of the cam, a projection section (cam nose) of the cam pushes down an intake valve or an exhaust valve (each not shown) against an urging force of a valve spring. Therefore the intake valve and the exhaust valve are respectively changed from a closing-state to an opening-state.

A variable valve timing device 18 of an electrically-operated type is provided in the intake valve. The rotational phase of the intake-side cam shaft 16 (cam shaft phase) relative to the crank shaft 12 is changed by the variable valve timing device 18 to change opening/closing timing (valve timing) of the intake valve.

Figure 2:
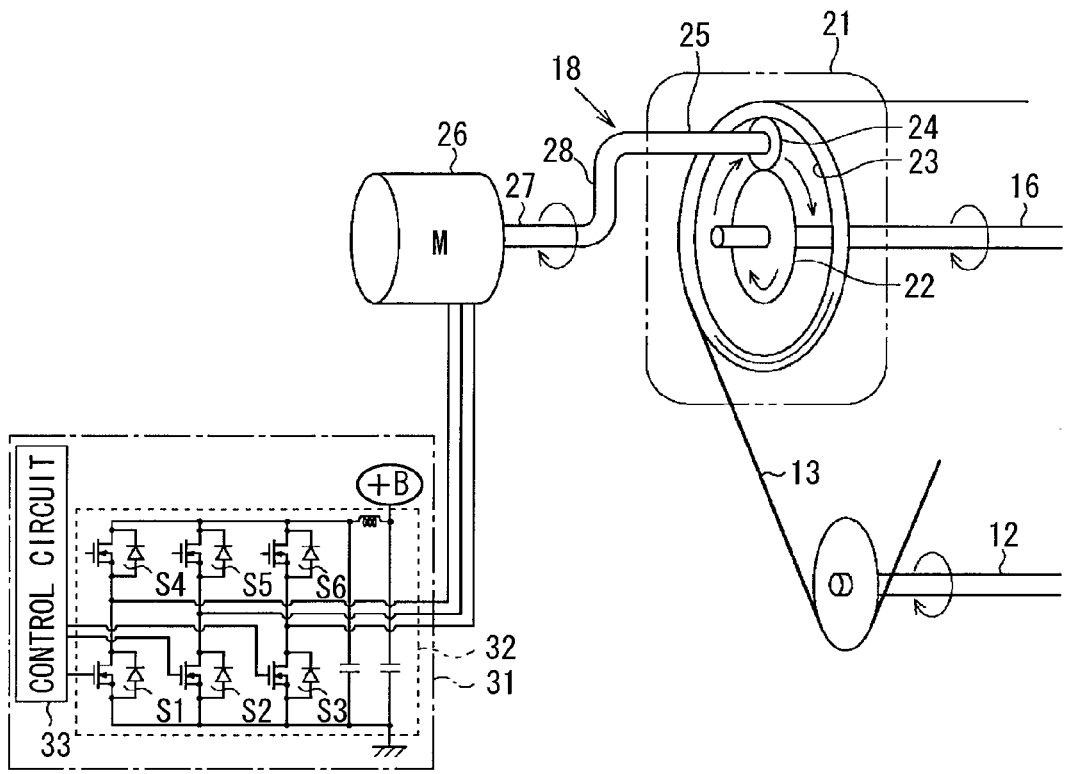
FIG. 2 is a schematic construction diagram of a variable valve timing device according to an embodiment of the present invention.

FIG. 2 is a diagram showing a schematic construction of the variable valve timing device 18. In FIG. 2, a phase variable mechanism 21 is mounted in the intake-side cam shaft 16. The phase variable mechanism 21 is formed of an inner gear 22 (first gear) with external teeth mounted in the intake-side cam shaft 16, an outer gear (second gear) with internal teeth arranged on a peripheral of the inner gear 22, and a planetary gear 24 (phase variable gear) arranged between the inner gear 22 and the outer gear 23 to be engaging thereto. The inner gear 22 and the outer gear 23 are provided concentrically with respect to the intake-side cam shaft 16. Further, the outer gear 23 is provided to rotate integrally with the intake-side sprocket 14.

A motor 26 (three-phase AC motor in the present embodiment) is provided in the variable valve timing device 18 for changing a turning speed of the planetary gear 24. A rotational shaft 27 of the motor 26 is arranged coaxially with the intake-side cam shaft 16, the inner gear 22 and the outer gear 23. The rotational shaft 27 and a support shaft 25 of the planetary gear 24 are coupled via a coupling member 28 extending in a radial direction. Thereby, the rotation of the motor 26 enables the planetary gear 24 to rotate around the support shaft 25 (axial rotation), and simultaneously to turn on the periphery of the inner gear 22 (orbital rotation).

In the phase variable mechanism 21, when the planetary gear 24 turns on the periphery of the inner gear 22 in a state of being engaged with the inner gear 22 and the outer gear 23, a rotational force of the outer gear 23 is transmitted via the planetary gear 24 to the inner gear 22. When a turning speed (orbital rotation speed) of the planetary gear 24 relative to a rotational speed of the inner gear 22 (rotational speed of the intake-side cam shaft 16) is changed, a rotational phase of the inner gear 22 (cam shaft phase) relative to the outer gear 23 is changed.

In detail, when the rotational shaft 27 of the motor 26 rotates in synchronization with the outer gear 23 at non-power supply to the motor 26, the rotational speed of the motor 26 is in agreement with the rotational speed of the outer gear 23. Therefore the rotational phase of the inner gear 22 relative to the outer gear 23 is maintained at the present state, and the valve timing (cam shaft phase) is maintained at the present state. When the rotational speed of the motor 26 is changed relative to the rotational speed of the outer gear 23, the turning speed of the planetary gear 24 is changed relative to the rotational speed of the outer gear 23 to change the rotational phase of the inner gear 22 relative to the outer gear 23. Thereby the valve timing is changed.

For example, in a case of advancing the valve timing, the rotational speed of the motor 26 is made to be faster than the rotational speed of the outer gear 23, and the turning speed of the planetary gear 24 is made to be faster than the rotational speed of the outer gear 23. Thereby the rotational phase of the inner gear 22 relative to the outer gear 23 is advanced to advance the valve timing. Meanwhile, in a case of retarding the valve timing, the rotational speed of the motor 26 is made to be slower than the rotational speed of the outer gear 23, and the turning speed of the planetary gear 24 is made to be slower than the rotational speed of the outer gear 23. Thereby the rotational phase of the inner gear 22 relative to the outer gear 23 is retarded to retard the valve timing.

In the variable valve timing device 18, the inner gear 22, the outer gear 23 and the planetary gear 24 are configured in such a manner that the intake-side cam shaft 16 is driven and rotated in ½ of the rotational speed of the crank shaft 12 at a steady time. The rotational speed of the motor 26 is adjusted to the rotational speed which is ½ of the rotational speed of the crank shaft 12 (at a steady state, ½ of the rotational speed of the crank shaft 12=rotational speed of the intake-side cam shaft 16) to change the valve timing (cam shaft phase) of the intake valve.

Referring back to FIG. 1, a cam angle sensor 19 is provided in a position facing the intake-side cam shaft 16 for outputting a cam angle signal every predetermined cam angle, and a crank angle sensor 20 is provided in a position facing the crank shaft 12 for outputting a crank angle signal every predetermined crank angle. Further, a motor rotational angle sensor 29 is provided in the vicinity of the rotational shaft 27 (refer to FIG. 2) of the motor 26 for outputting a motor rotational angle signal every predetermined rotational angle in synchronization with rotation of the motor 26. A rotational angle of the motor 26 (motor rotational position) can be detected by an output signal of the motor rotational angle sensor 29.

An ECU 30 is an electronic control unit provided with a known microcomputer and the like, and performs various kinds of engine control such as fuel injection quantity control, ignition control, and valve timing control based upon detection signals of various sensors provided in the present system.

The ECU 30 controls a cam shaft phase corresponding to an engine operating state by controlling an energization of the motor 26. Specially, the ECU 30 calculates a rotational phase of the cam shaft 16 (actual cam shaft phase) relative to the crank shaft 12 based upon, for example, output signals of the cam angle sensor 19 and the crank angle sensor 20. In addition, the ECU 30 calculates a target cam shaft phase corresponding to an engine operating condition. For example, if the engine is running, a target motor rotational speed is calculated based upon a deviation between the calculated target cam shaft phase (target valve timing) and the calculated actual cam phase (actual valve timing), and the engine rotational speed. A power supply duty ratio (power supply control amount) of the motor 26 is calculated by feedback control based upon a deviation between the calculated target motor rotational speed and the actual motor rotational speed. The calculated power supply duty ratio is outputted to the motor drive circuit (hereinafter, EDU) 31. The EDU 31 performs power supply to the motor 26 based upon the power supply duty ratio inputted from the ECU 30 and a detection signal of the motor rotational angle sensor 29. The function of the EDU 31 may be incorporated in the ECU 30.

The EDU 31 includes, in detail, a switching circuit 32 having a plurality of switching elements S1 to S6 and applying a drive voltage to each coil of the motor 26 by switching the switching elements S1 to S6. Further, the EDU 31 includes a control circuit 33 for controlling the switching elements S1 to S6 to output a drive voltage to each coil of the motor 26 from the switching elements S1 to S6. The EDU 31 controls a switching operation of each of the switching elements S1 to S6 to switch power supply/non-power supply to each coil of the motor 26, thereby controlling a drive of the motor 26. The motor device is formed of the motor 26 and the motor drive circuit (EDU) 31.

An optimal value of the valve timing at engine starting-up differs depending on a temperature of the engine 11 (engine water temperature), and the optimal value is the closer to an advance side as the engine water temperature is the lower. Therefore in a case where the engine is stopped by the IG switch-off and the cam shaft phase is not set to a phase corresponding to an engine startup water temperature (particularly a temperature at a cooling startup time) at the next engine startup after that, there is a possibility that the engine 11 can not be certainly started.

In view of the above, in the present system, preparing for a case where the engine is stopped by the IG switch-off and afterwards the next engine startup is performed at a cooling time, post-stop control (first power supply control) for changing the cam shaft phase to a phase suitable at the cooling startup is performed. In consequence, at the next engine startup, the engine 11 can be certainly started.

Calculation of an actual cam shaft phase after the engine stop is conducted based upon an output signal of the motor rotational angle sensor 29. Specially, the ECU 30 calculates an actual cam shaft phase immediately before the engine stop, based upon output signals of the cam angle sensor 19 and the crank angle sensor 20. In addition, an operating amount of the motor 26 after the engine stop is calculated based upon output of the motor rotational angle sensor 29. The actual cam shaft phase after the engine stop is calculated based upon the actual cam shaft phase immediately before the engine stop and the motor operating amount after engine stop.

In a case of changing the cam shaft phase after the engine stop, it is required to operate the cam shaft 16 from a rotation stop state. Therefore, upon changing the rotational phase of the cam shaft 16 (changing the valve timing) by the variable valve timing device 18 after the engine stop, influences of a state of engagement between the respective gears in the phase variable mechanism 21, the valve spring and the like become possibly larger than during engine operating. Therefore upon changing the cam shaft phase after the engine stop, there is a possibility that there occurs a state (lock state) where the changing in the rotational phase of the cam shaft 16 relative to the crank shaft 12 stops or substantially stops in the middle of the phase changing.

More specifically, in each gear (inner gear 22, outer gear 23, and planetary gear 24) of the phase variable mechanism 21, it is likely that deformations are generated due to processing errors or thermal processing in regard to teeth of each gear in the manufacturing process, for example. Therefore, it is likely that an engaging state between the respective gears is deteriorated due to the deformations in the respective gears depending on a positional relation between the gears in the rotational direction, and it is temporarily hard to transmit the rotational force of the motor 26 to the cam shaft 16. In this case, the torque becomes insufficient for rotating the cam shaft 16, and as a result, the lock state possibly tends to occur easily.

When the cam shaft 16 is rotated relative to the crank shaft 12 by the variable valve timing device 18, the intake valve is forcibly displaced against an urging force of the valve spring, that is, it is required to go over the cam nose of the cam mounted in the cam shaft 16. At this time, since the rotation of the crank shaft 12 stops after the engine stop, the load for pressing and contracting the valve spring is larger than during the engine operating. Therefore the pressing-down force of the cam nose can not overcome the force from the valve spring at the time of rotating the cam shaft 16, and as a result, the lock state of the cam shaft 16 possibly occurs. When the intake-side cam shaft 16 does not rotate due to the various factors, it is not possible to change the valve timing to a desired timing (for example, optimal timing at a cooling startup), and as a result, there is a possibility that starting performance at the next engine startup is deteriorated.

Therefore in the present embodiment, when performing the valve timing control after the engine stop so that the actual phase of the intake-side cam shaft 16 is changed to a target cam shaft phase, it is detected whether a lock state occurs in which the cam shaft phase does not change. When it is detected that the lock state occurs, the lock release control (second power supply control) for eliminating the lock state of the cam shaft 16 is performed by the power supply control of the motor 26. In the present embodiment, as to the lock release control, the cam shaft phase is temporarily controlled in a direction opposing the changing direction to the target cam shaft phase. More specially, the cam shaft 16 is reversely rotated once by reversing the power supply direction to the motor 26, and after that, control for returning the power supply direction back to the original is performed.

Particularly when transferring the post-stop control of the valve timing to the lock release control, a motor cooling control for cooling the motor device (motor 26, EDU 31) is performed before performing the lock release control.

Figure 3:
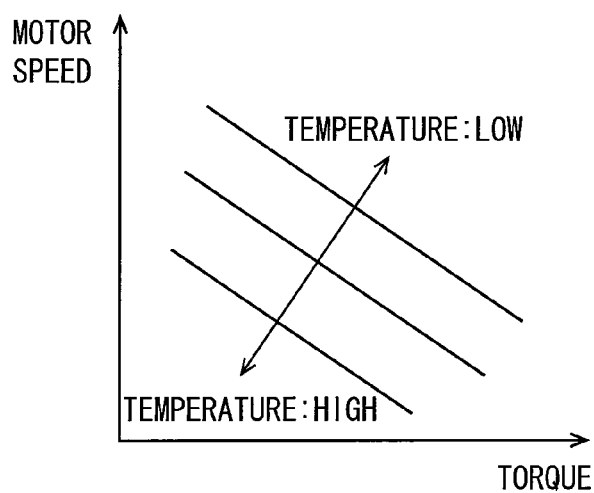
FIG. 3 is a graph showing temperature characteristics of a motor in the variable valve timing device.

Immediately after the operation stop of the engine 11, a temperature of the motor 26 (motor temperature) is relatively high by heat generation in the engine 11 before the engine operation stop or heat generation of the motor 26 due to the operation of the variable valve timing device 18. The motor 26 has temperature characteristics, and specially as shown in FIG. 3, has the characteristics that the motor torque becomes smaller as the motor temperature is higher. Here, at a normal time when the lock does not occur, the motor torque is not required so much for changing the cam shaft phase. On the other hand, at lock occurrence, larger motor torque is required for the lock release than at the changing of the cam shaft phase at the normal time. Therefore, when the motor is at a high temperature, there is a possibility that the motor 26 can not output torque required for releasing the lock.

In addition, it takes a given time until a point of determining the lock occurrence from a point where no change of the cam shaft phase starts in the middle of changing the cam shaft phase. Accordingly, for a period until the lock occurrence is determined, the power supply to the motor 26 by the EDU 31 continues to be performed in a state where the lock state occurs. In this case, the temperature of the motor 26 becomes higher and the motor torque is further decreased by the excessive temperature rise of the motor 26. As a result, there is a possibility that the lock release can not be achieved by the motor power supply control.

At this time, a heat generation amount of the switching elements S1 to S6 becomes large by the power supply at the lock state, and therefore there is a possibility that failures of the switching element S1 to S6 are brought in. Particularly, in a configuration where the power supply control to the motor 26 is performed by the feedback control, a deviation between the actual cam shaft phase and the target cam shaft phase is not eliminated at the lock occurrence. Therefore, for eliminating the deviation, a relatively large value is set as a power supply duty ratio (power supply control amount) to the motor 26 and thereby large current flows in the motor 26 or in the switching elements S1 to S6. As a result, a temperature rise in the motor 26 or the switching elements S1 to S6 tends to be easily made. In a case of controlling the switching elements S1 to S6 corresponding to a motor rotational position detected by the motor rotational angle sensor 29, since the motor rotational position does not change at the lock occurrence, the power supply state continues in a part of the switching elements. As a result, the heat generation amount of the corresponding switching element becomes further larger.

In view of the above, in the present embodiment, in a case where the lock state of the cam shaft 16 occurs in the post-stop control of the valve timing, a temperature of the motor device is first lowered by the motor cooling control, and afterwards the power supply control is performed for releasing the lock.

Figure 4:
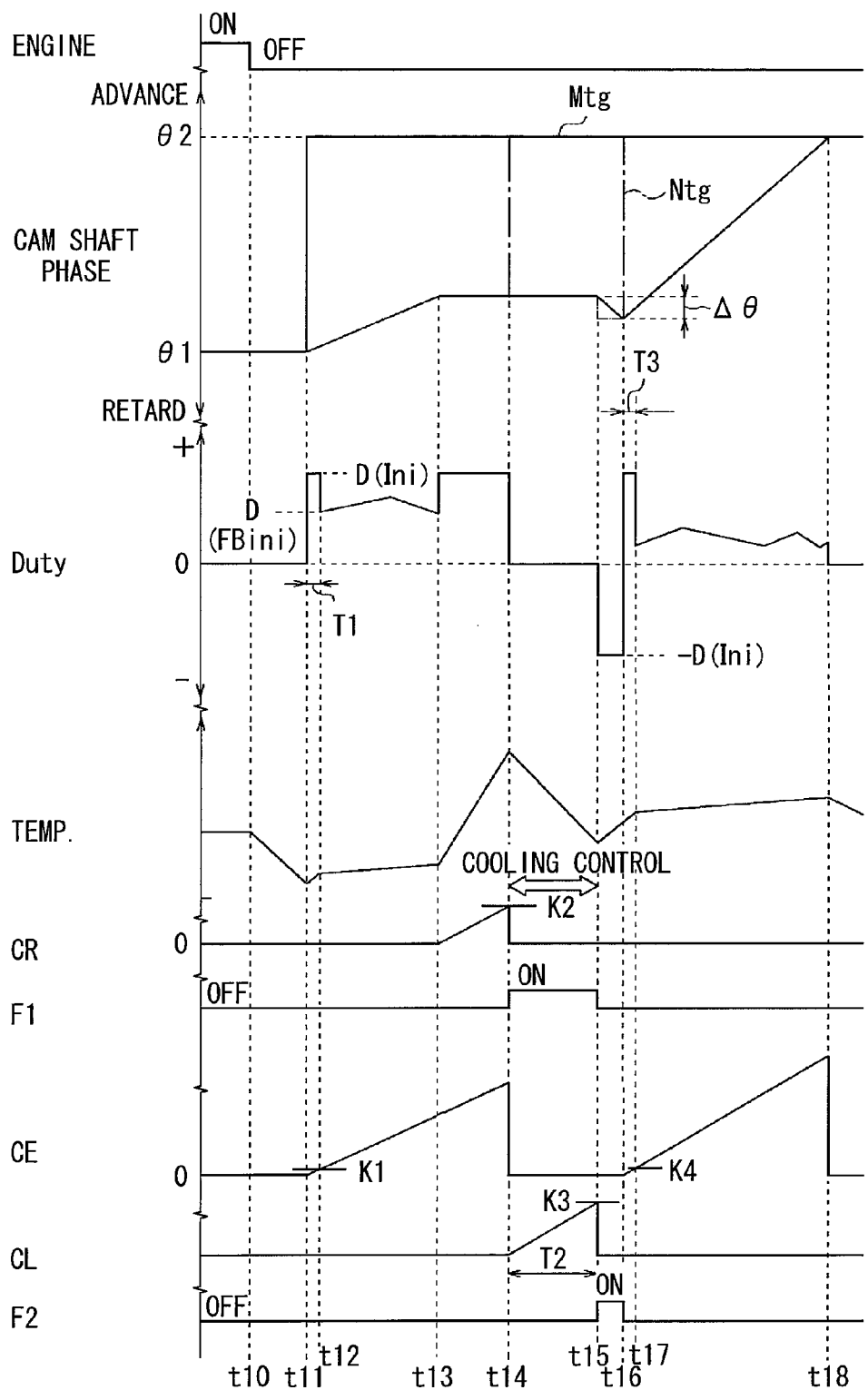
FIG. 4 is a time chart showing special states of phase control and cooling control at lock state occurrence according to the embodiment.

Next, with reference to a time chart shown in FIG. 4, an explanation will be made with respect to a case where the lock state occurs in the variable valve timing device 18 in the middle of changing the cam shaft phase after the operation stop of the engine 11. In FIG. 4, a portion (a) shows an ON/OFF condition of the engine 11, a portion (b) shows a transition of a phase of the cam shaft 16, a portion (c) shows a transition of a power supply duty ratio of the motor 26, a portion (d) shows a transition of a temperature of the switching element, a portion (e) shows a transition of a lock counter CR, a portion (f) shows a transition of ON/OFF of a lock determination flag F1, a portion (g) shows a transition of a power supply counter CE, a portion (h) shows a transition of a cooling time counter CL, and a portion (i) shows a transition of ON/OFF of a lock release flag F2.

In FIG. 4, at timing t10 immediately after the engine stop, the cam shaft phase is set to the maximum retard angle position $\theta1$. At timing t11, the target cam shaft phase is first changed, for example, to an optimal phase $\theta2$ at an engine cooling startup (value in an advance side by, for example, 50 to 70° CA from the maximum retard angle position $\theta1$), and power supply increasing control starts along with the change. A count-up of the power supply counter CE starts.

In the power supply increasing control, a power supply duty ratio Duty of the motor 26 is set to an increasing value D(Ini).

In the present control, the increasing value D(Ini) is larger than a control amount by the feedback control which will be performed after the power supply increasing control.

Specially the increasing value D(Ini) is set to the power supply duty ratio (for example, power supply duty ratio equal to 80% or more) by which the torque required for overcoming a static friction force exerting on the cam shaft 16 or the variable valve timing device 18 to rotate the cam shaft 16 can be outputted.

When a predetermined time T1 elapses after the power supply increasing control starts and the power supply counter CE reaches a determination value K1, the feedback control at the power supply duty ratio of the motor 26 starts at the timing t12. Specially, at timing t12, the power supply duty ratio is set to an initial value D(FBini), and afterwards, the feedback control using an integral term is performed.

There will be reviewed a case where there occurs a state (lock state) where the cam shaft phase does not change regardless of supplying power to the motor 26 at timing t13 in the middle of controlling an actual cam shaft phase to a target value. In this case, since a deviation between the actual cam shaft phase and the target cam shaft phase does not become small, a relatively large value is set as a power supply duty ratio of the motor 26. Therefore a temperature of the motor 26 or the EDU 31 (particularly the switching elements S1 to S6) rapidly rises.

As to the control at a lock occurrence, the motor cooling control is first performed for lowering the temperature of the motor 26 or the EDU 31. The motor cooling control in the present embodiment is to stop the power supply to the motor device and lower a temperature of the motor device by heat release at the power supply stop state.

Specifically, at timing t13, count-up of the lock counter CR starts. When the lock counter CR reaches a determination value K2, a lock determination flag F1 is switched from OFF to ON at the timing t14, and the motor power supply is stopped and the power supply counter CE is reset to zero. Also, a count-up of the cooling time counter CL starts. When a predetermined time T2 elapses after the motor power supply stop starts and the cooling time counter CL reaches a determination value K3, the lock determination flag F1 is set to OFF to stop the cooling of the motor device at the timing t15. The lock release flag F2 is set to ON. Thus, the motor cooling control is transferred to the lock release control.

In the present embodiment, the cooling time T2 is set to a time required for lowering the EDU 31 (particularly the switching element) to a predetermined temperature as a result of the power supply stop (several seconds).

In the lock release control, the power supply is made in a direction opposing the power supply direction in the power supply increasing control and the power supply feedback control, and thereby the cam shaft phase is changed in a direction opposing the changing direction to the target value. Specially, in the present control, a preliminary target value Ntg used for each processing is set. The preliminary target value Ntg is different from a final control target value Mtg of the cam shaft phase. At a normal time when the lock state does not occur, the control target value Mtg (solid line in FIG. 4) is set as the preliminary target line Ntg. At a lock occurrence, a preliminary target value Ntg (dashed line) for the lock occurrence time is calculated, and the cam shaft phase is controlled by the calculated preliminary target value Ntg. As to the preliminary target value Ntg for the lock occurrence time, in the present embodiment, a value is set in a retard side by a predetermined changing amount $\Delta\theta$ (for example, 10° CA) from the cam shaft phase at the lock detection time. After setting the preliminary target value Ntg for the lock occurrence time, the power supply duty ratio is switched to a negative current duty ratio for making the actual cam shaft phase equal to the preliminary target value Ntg. The negative predetermined value is, for example, −D(Ini).

When the actual cam shaft phase reaches the preliminary target value Ntg after start of a reverse rotation of the cam shaft 16, the lock release flag F2 is set to OFF at the timing t16, and the target value of the cam shaft phase is returned back to the control target value Mtg. In response to the change of the target value, the power supply duty ratio of the motor 26 is switched to a duty ratio of positive current. In the present embodiment, the power supply duty ratio of the motor 26 is temporarily increased to a predetermined increasing value (for example, increasing value D(Ini)) for a predetermined time T2 from timing t16.

That is, at the lock detection time, the rotational direction of the intake-side cam shaft 16 is reversed once, and afterwards, the rotational direction is again switched at one time to the changing direction (forward rotation) to the control target value Mtg. The switching from the reverse rotation to the forward rotation of the cam shaft 16 gives momentum to the rotation, whereby the lock state of the intake-side cam shaft 16 is released.

When a predetermined time T3 elapses from timing t16, the phase control is switched to the power supply feedback control of the motor 26 at the timing t17. When the actual cam shaft phase is in agreement with the target cam shaft phase at timing t18, the feedback control is finished to stop the power supply to the motor 26.

In FIG. 4, an explanation is made of a case of changing the cam shaft phase from the retard side to the advance side after the engine stop. The same can be applied to a case of changing the cam shaft phase from the advance side to the retard side. In this case, as to the preliminary target value Ntg for the lock occurrence time, a value is set in an advance side by a changing amount $\Delta\theta$ (for example, 10° CA) from the actual cam shaft phase. The changing amount $\Delta\theta$ may be variably set corresponding to lock occurrence frequency of after the engine stop.

Figure 5:
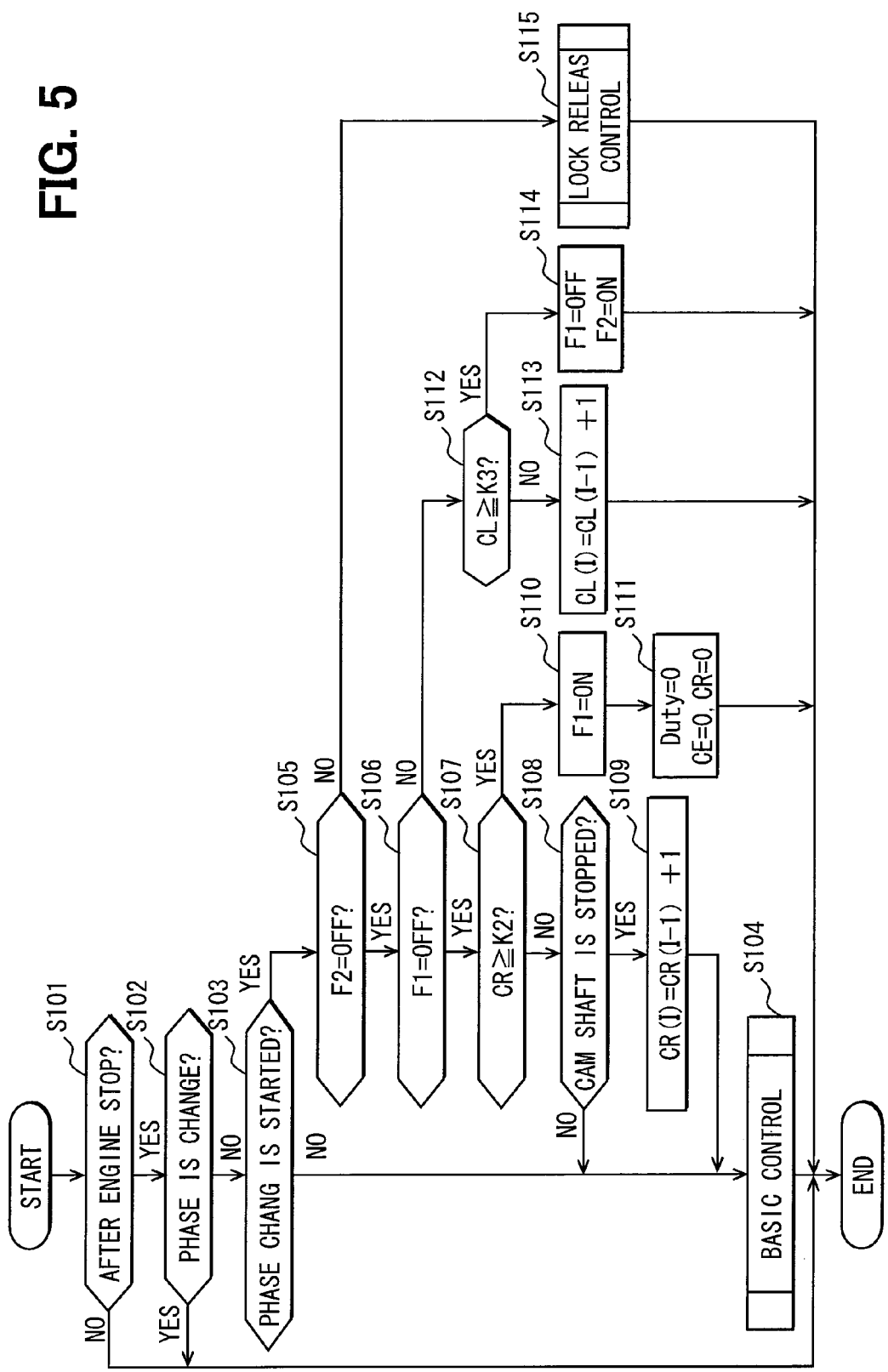
FIG. 5 is a flow chart showing phase control of a cam shaft after an engine stop according to the embodiment.

Next, a phase control of the cam shaft 16 after the engine stop will be explained with reference to a flow chart in FIG. 5. The present processing is executed every predetermined cycle by the ECU 30. In the present system, after OFF of an ignition switch (IG switch) (not shown), switching on a main relay of a power source line enables the power to be supplied to the ECU 30, the EDU 31, the motor 26 and the like.

At step S101, it is detected whether or not the engine is in a state after the engine stop in response to OFF of the IG switch. When it is detected that the engine is in a state of the engine operating, the present routine ends. Then, the phase control for engine operating time (not shown) is performed. In this control, for example, a target motor rotational speed is calculated based upon a deviation between a control target value Mtg and an actual cam shaft phase θre, and an engine rotational speed. Feedback control of a duty ratio of the motor 26 is performed based upon a deviation between the calculated target motor rotational speed and the actual motor rotational speed.

When the engine is in a state after the engine stop, the process goes to step S102, wherein it is determined whether or not the change of the phase to the control target value Mtg is completed. When the phase change is not completed yet, the process goes to step S103, wherein it is determined whether or not the phase changing process is already started. When the phase changing process is not started yet, the process goes to step S104, wherein basic control of the cam shaft phase change after the engine stop (post-stop basic control) is performed.

Figure 6:
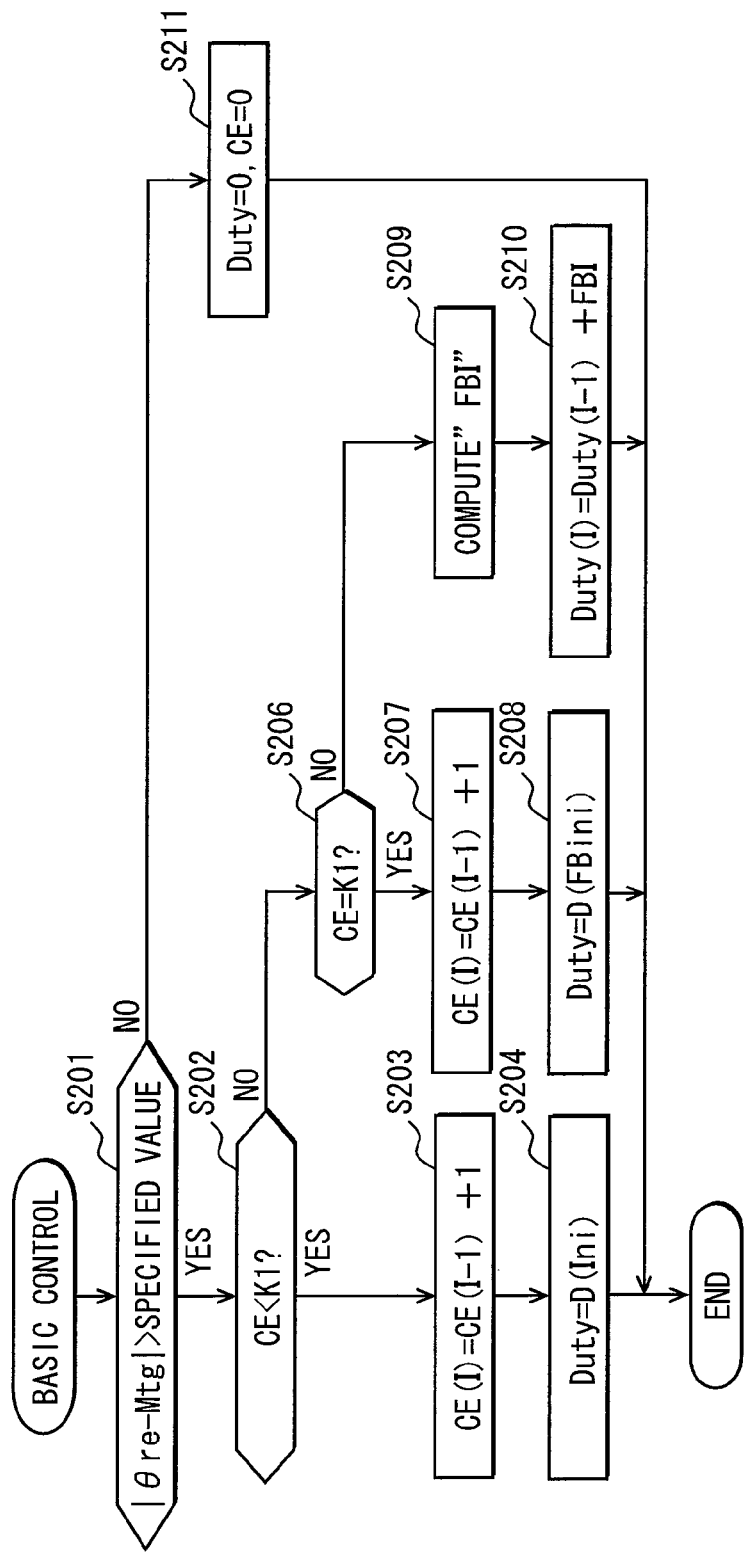
FIG. 6 is a subroutine showing basic control after the engine stop according to the embodiment.

FIG. 6 is a subroutine showing the post-stop basic control. At step S201 a control target value Mtg is set as a preliminary target value Ntg, and a difference between an actual cam shaft phase θre and the control target value Mtg is calculated. Then, it is determined whether or not an absolute value of the calculated value is larger than a predetermined value. The actual cm shaft phase θre is calculated based upon an actual cam shaft phase immediately before the engine stop and a cam shaft rotational amount of after the engine stop is detected based upon output of the motor rotational angle sensor 29.

When the difference (absolute value) between the actual cam shaft phase θre and the control target value Mtg is larger than the predetermined value, the process goes to step S202, wherein it is determined whether or not the power supply counter CE is smaller than the determination value K1. When the power supply counter CE is smaller than the determination value K1, the power supply increasing control at steps S203 and S204 is performed. Specially, at step S203, the power supply counter CE is counted up by a predetermined value ("1" in the present processing). At step S204, the power supply duty ratio Duty is set to the increasing value D(Ini), and a command is given to the EDU 31 to perform the power supply control to the motor 26 with the set power supply duty ratio Duty (increasing value D(Ini)).

When the power supply counter CE is more than or equal to the determination value K1, the process goes to step S206, wherein the power supply increasing control transfers to the feedback control. Specially, at step S206, it is determined whether or not the power supply counter CE is the determination value K1. When the power supply counter CE is the determination value K1, the process goes to step S207, wherein the power supply counter CE is counted up by "1". At subsequent step S208, the power supply duty ratio Duty is set to an initial value D(FBini), and a command is given to the EDU 31 to perform the power supply control to the motor 26 with the set power supply duty ratio Duty (initial value D(FBini)).

In the present embodiment, the initial value D(FBini) is set in response to an actual changing speed of the cam shaft phase during the power supply increasing control. At this time, the initial value D(FBini) is set to be larger as the changing speed of the cam shaft phase during the power supply increasing control is smaller (the load torque of the variable valve timing device 18 is larger). The changing speed of the cam shaft phase during the power supply increasing control is obtained, for example, by dividing a changing amount of the actual cam shaft phase during a period of performing the power supply increasing control by the performing time.

When the power supply counter CE is larger than the determination value K1, the process goes to step S209, wherein a deviation between an actual current changing speed of the cam shaft phase and a target changing speed is calculated, and an integral term "FBI" of the feedback control is calculated corresponding to the calculated deviation. At this time, an integral gain used for the calculation of the integral term "FBI" is set corresponding to the actual changing speed of the cam shaft phase during the power supply increasing control. The integral gain is set to become larger as the actual changing speed of the cam shaft phase during the power supply increasing control becomes smaller (as the load torque in the variable valve timing device 18 becomes larger).

When calculating the deviation between the actual changing speed of the current cam shaft phase and the target changing speed, the calculation processing may be simplified by fixing the target changing speed of the cam shaft phase to a predetermined value. Alternatively, the target changing speed of the cam shaft phase may be set corresponding to the deviation between the actual current cam shaft phase and the target cam shaft phase. At this time, for example, as the deviation between the actual cam shaft phase and the target cam shaft phase becomes smaller, the target changing speed of the cam shaft phase becomes smaller. For calculating the integral term "FBI", the integral term "FBI" may be calculated according to the actual changing speed of the cam shaft phase during the power supply increasing control and the deviation between the actual current changing speed of the cam shaft phase and the target changing speed.

At step S210, the integral term "FBI" is added to the previous power supply duty ratio Duty(I−1) to calculate a current power supply duty ratio Duty(I). A command is transmitted to the EDU 31 to perform the power supply control to the motor 26 with the calculated power supply duty ratio Duty (Duty(I)).

When the answer is NO at step S201, the process goes to step S211. At step S211, the power supply duty ratio Duty of the motor 26 is set to zero, and the power supply counter CE is reset to zero.

Referring back to FIG. 5, when the answer is YES at step S103, the process goes to step S105. At step S105, it is determined whether or not the lock release flag F2 is OFF. In a case where the lock release flag F2 is OFF, the process goes to step S106, wherein it is determined whether or not the lock determination flag F1 is OFF. When the lock determination flag F1 is OFF, the process goes to step S107, wherein it is determined whether or not the lock counter CR is the determination value K2 or more. When CR<K2, the process goes to step S108, wherein it is determined whether or not the rotation of the cam shaft 16 is in a state of stopping or substantially stopping. Specially a rotational changing amount of the motor 26 per unit time (changing speed of the cam shaft phase) is calculated based upon an output signal of the motor rotational angle sensor 29. When the calculated rotational changing amount per unit time is less than or equal to a predetermined value, it is determined that the rotational change of the intake-side cam shaft 16 is in a state of stopping or substantially stopping.

The lock determination is not limited to the above embodiment. For example, when the phase control is in the middle of the feedback control of the power supply duty ratio to the motor 26, the gain of the integral term "FBI" may be variably set in response to the changing speed of the cam shaft phase to determine presence/absence of occurrence of the lock state based upon the gain.

When the answer is NO at step S108, the post-stop basic control at step S104 is performed. When the answer is YES at step S108, the process goes to step S109, wherein the lock counter CR is counted up by "1".

When the lock counter CR becomes the determination value K2 or more at step S107, the process goes to step S110. At step S110, the lock determination flag F1 is set to ON. At step S111, the power supply duty ratio of the motor 26 is set to zero (power supply to motor is stopped). Also, the power supply counter CE and the lock counter CR are reset to zero.

When the lock determination flag F1 is ON at step S106, the process goes to step S112. At step S112, it is determined whether or not the cooling time counter CL is the determination value K3 or more. When the cooling time counter CL is less than K3, the process goes to step S113, wherein the cooling time counter CL is counted up by "1". When the cooling time counter CL is K3 or more, the process goes to step S114, wherein the lock determination flag F is set to OFF and the lock release flag F2 is set to ON.

Figure 7:
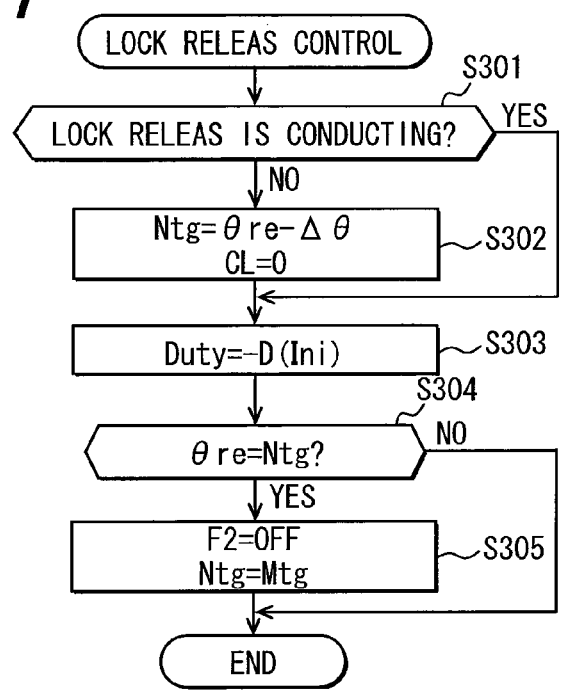
FIG. 7 is a flow chart showing lock release control according to the embodiment.

When the lock release flag F2 is ON at step S105, the process goes to step S115, wherein the lock release control shown in FIG. 7 is performed. In FIG. 7, at step S301, it is determined whether or not the lock release is conducting. At start timing of the lock release, the negative determination is made at step S301. The process goes to step S302, wherein the preliminary target value Ntg is set to an angle (θre−Δθ) shifted by a changing amount Δθ (for example, 10° CA) from the actual cam shaft phase θre in a direction opposing the changing direction to the control target value Mtg. The cooling time counter CL is reset to zero.

In the present embodiment, the cam shaft phase is indicated based upon the control target value Mtg, a direction of being closer to the control target value Mtg is indicated at a positive code, and a direction of being away from the control target value Mtg is indicated at a negative code. Therefore, in regard to a formula (preliminary target value Ntg=actual cam shaft phase θre−changing amount Δθ) at step S302, in a case where the control target value Mtg is in an advance side relative to the cam shaft phase immediately after the engine stop, a value in a retard side by the changing amount Δθ from the actual cam shaft phase θre becomes a preliminary target value Ntg. On the other hand, in a case where the control target value Mtg is advanced relative to the cam shaft phase immediately after the engine stop, a value advanced by the amount Δθ from the actual cam shaft phase θre becomes a preliminary target value Ntg.

At step S303, the power supply duty ratio Duty is set to a value in reverse in a positive-negative direction with respect to a direction in which the actual cam shaft phase Ore is changed to the control target value Mtg. Specially, for example, the power supply duty ratio Duty is set to "−D(Ini)" having the same magnitude as an increasing value D(Ini) in the power supply increasing control. A command is transmitted to the EDU 31 to perform the power supply control to the motor 26 with the power supply duty ratio Duty (for example, "−D(Ini)").

At step S304, it is determined whether or not the actual cam shaft phase Ore reaches the preliminary target value Ntg. When the actual cam shaft phase θre does not reach the preliminary target value Ntg, the present routine ends. When the actual cam shaft phase θre reaches the preliminary target value Ntg, the process goes to step S305, wherein the lock release flag F2 is set to OFF.

Immediately after performing reverse rotation of the cam shaft 16 for a predetermined period, the answers at steps S105 and S106 are YES, and the answers at steps S107 and S108 are NO. The process goes to step S104, wherein the post-stop basic control is performed. Therefore, the cam shaft 16 is switched from the reverse rotation to the forward rotation, and immediately after the switching, the motor power supply duty ratio is temporarily increased to an increasing value D(Ini).

The lock release is achieved by using the momentum of rotation from the reverse rotation to the forward rotation at this time. In the present embodiment, the temporal increasing time (T3 in FIG. 4) after the forward rotation is set to the same as the performance time (T1 in FIG. 4) of the power supply increasing control. Alternatively, T3 may be different in length from T1 or may be longer than T1.

According to the embodiment described above, the following advantages can be obtained.

When the lock state of the variable valve timing device 18 occurs in the middle of changing the cam shaft phase to the target cam shaft phase, the temperature of the motor device (motor 26 and the motor drive circuit 31) is lowered by performing the motor cooling control. Further, when the temperature of the motor device is lowered, the power supply control (lock release control) is performed for eliminating the lock state of the variable valve timing device 18. Thereby, it is avoided that the motor torque is decreased due to the high temperature of the motor 26 or the failures of the switching elements S1 to S6. Therefore, the lock state of the cam shaft can be certainly released by the lock release control. Finally, the valve timing at the engine stop can be appropriately controlled.

Since it is structured to stop the power supply via the EDU 31 to the motor 26 and use heat release at that state, the temperature of the motor device can be lowered with a relatively simple structure without providing the other device for cooling the motor device.

When the lock state of the variable valve timing device 18 occurs, the lock release control is conducted to temporarily vary the cam shaft phase in a direction opposing the changing direction to the target cam shaft phase. Therefore, when the rotational phase of the cam shaft 16 is rotated in the changing direction to the target value afterwards, the lock state can be certainly released with the momentum of the rotation caused by the reverse rotation of the cam shaft 16. In addition, since the motor device is cooled before performing the control of the cam shaft phase in the reverse direction, the reverse rotation of the cam shaft 16 can be certainly made in the same control.

When returning the cam shaft 16 back to the original rotational direction after reversely rotating the cam shaft 16 by the lock release control, the power supply amount to the motor 26 is temporarily increased to a predetermined increasing amount D(Ini) at the start of changing the rotational direction. Therefore, the output of the motor 26 can increase appropriately and instantly when transferring from the reverse rotation to the forward rotation of the cam shaft 26. Furthermore, the momentum of the rotation of the cam shaft 16 is increased. As a result, the lock release can be more certainly achieved.

[Second Embodiment]

A second embodiment will be described hereinafter, focusing on a difference from the first embodiment. In the present embodiment, when the lock state of the cam shaft 16 occurs in the middle of performing the post-stop control, the lock release control (third power supply control) is first performed. If the lock release can not be achieved by the lock release control, the motor cooling control is performed. After the motor cooling control is performed, the lock release is again performed by the lock release control (second power supply control). That is, in the present embodiment, only in a case where the lock release can not be achieved by the lock release control, the cooling of the motor device is performed.

More specially, according to the present embodiment, when it is detected that the lock state of the cam shaft 16 occurs, a reverse rotation control for temporarily controlling the cam shaft phase in a direction opposing the changing direction to the target value is performed as the lock release control (reverse rotational control). It is determined whether or not the change of the cam shaft in the reverse direction occurs by the reverse rotational control (reverse rotational determination). At this time, when it is determined that the change of the cam shaft in the reverse direction occurs, the rotational phase of the cam shaft is returned back to the forward direction without performing the cooling of the motor device, for example, transfers to the post-stop control. Meanwhile, when it is determined that the change of the cam shaft in the reverse direction does not occur, the motor device is cooled and the cam shaft is reversely rotated once more for the lock release.

Figure 8:
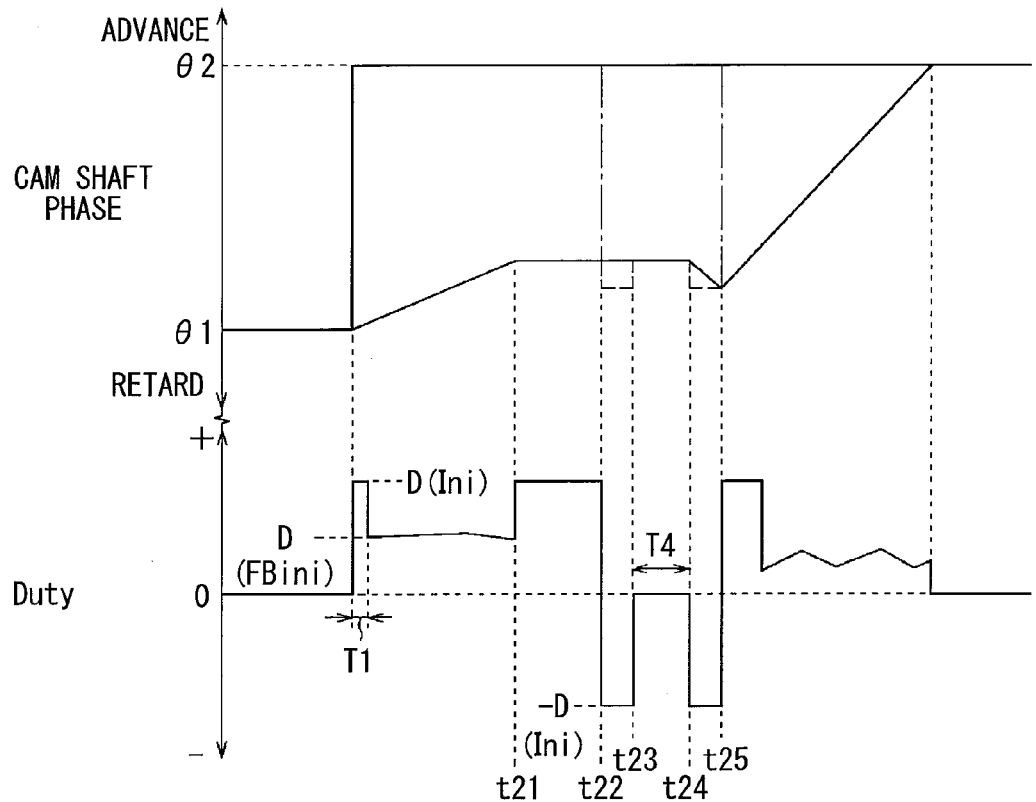
FIG. 8 is a time chart showing special states of phase control and cooling control at lock state occurrence according to a different embodiment.

FIG. 8 is a time chart showing the phase control after the engine stop in the present embodiment, in which a transition of the phase of the cam shaft 16 and a transition of the power supply duty ratio of the motor 26 are shown.

It will be reviewed that the rotation of the cam shaft 16 stops or substantially stops at timing t21 in the middle of changing an actual cam shaft phase to a target value, and it is determined that the lock occurs at timing t22. In this case, at timing t22, a preliminary target value Ntg is first set to an angle ($\theta re-\Delta\theta$) shifted by a changing amount $\Delta\theta$ (for example, 10° CA) from the actual cam shaft phase $\theta$re in a direction opposing the changing direction to a control target value Mtg. A power supply duty ratio of the motor 26 is switched to a duty ratio of negative current.

It will be reviewed that a deviation between the actual cam shaft phase and the target value (preliminary target value Ntg) is not eliminated after the power supply duty ratio of the motor 26 is switched to the duty ratio of negative current at timing t22. In this case, the power supply to the motor 26 is stopped (the power supply duty ratio is set to zero) at timing t23, and the power supply stopping state continues for a predetermined time T4. The power supply duty ratio to the motor 26 is again set to the duty ratio of negative current at timing t24. When the cam shaft 16 is reversely rotated and the rotational phase reaches the target value (preliminary target value Ntg), the target value of the cam shaft phase is returned back to the control target value Mtg at the timing t25. The power supply duty ratio of the motor 26 is switched to a duty ratio of positive current (for example, an increasing value D(Ini)). The lock state is released by the switching from the reverse rotation to the forward rotation. Then, the feedback control is performed, so that the cam shaft phase becomes equal to the target value.

According to the present embodiment described above, the following advantages are further obtained.

At the lock occurrence, the power supply control is first performed for the lock release. If the lock release can not be achieved by the power supply control, the cooling of the motor device is performed. Therefore, only in a case where the motor torque required for the lock release can not be obtained due to the high temperature of the motor device, the cooling of the motor device can be performed. Therefore even in a case where the lock state occurs, when the lock release can be achieved by the power supply control, the cooling operation may be omitted.

[Other Embodiment]

The present invention is not limited to the embodiments described above, but may be performed, for example, in the following manner.

As a temperature detector for detecting a temperature of the motor device, a temperature sensor is arranged in the vicinity of the motor 26 or the EDU 31. This sensor detects a temperature of the motor device at a cooling start time or a temperature of the motor device at a lock determination time (temperature at timing t14 in FIG. 4). A cooling time of the motor device (T2 in FIG. 4) changes depending on the detected temperature. At this time, as the temperature of the motor device becomes higher, the cooling time becomes longer. The temperature detector is not limited to a detector for directly detecting the temperature of the motor device, and may be a detector for estimating it based upon an engine coolant temperature or the like.

A temperature of the motor device may be successively detected by the above temperature sensor during a period of performing the cooling of the motor device, and the cooling of the motor device may be stopped based upon the currently detected temperature. Specially, when the temperature of the motor device becomes a predetermined temperature or less within a cooling period of the motor device, the cooling of the motor device is stopped. Alternatively, when the temperature of the motor device is lowered by a predetermined amount within a cooling period of the motor device, the cooling of the motor device may be stopped. The predetermined temperature or the predetermined amount may be a preset constant value or may vary based upon a temperature at a cooling start time, a history of the lock occurrence or the like.

In the above embodiments, in regard to the lock release control (second power supply control) performed after cooling the motor device, the motor device (motor 26 and the EDU 31) is cooled by stopping the power supply via the EDU 31 to the motor 26. However, a cooling method for cooling the motor device (cooling control means) is not limited thereto. For example, a cooling fan may be arranged near the motor 26 or the EDU 31 for supplying cooling wind to the motor device. At this time, the power supply to the motor is stopped and the cooling fan may be operated together.

When the lock state occurs in the middle of changing the cam shaft phase, the cooling of the motor device by the motor cooling control and the following lock release control are repeated until the lock state is eliminated. In this case, at a time point when the performance frequency of the lock release control reaches a determination value, it is preferable that the power supply control for the lock release is not performed afterwards. In a case where the lock state can not be eliminated even if the power supply for the lock release is performed by a plurality of times after cooling the motor device, there is a possibility that it is difficult to achieve the lock release by the power supply control for the lock release. Therefore, in this case, the following lock release control is stopped to suppress wasteful power consumption due to the performance of the lock release control. In a case where the performance frequency of the lock release control reaches the determination value, the failure occurrence may be notified to a driver or the failure content may be stored in a memory for backup.

In the above embodiments, in regard to the lock release control (second power supply control) performed after cooling the motor device, the power supply direction of the motor 26 is reversed to temporarily rotate the cam shaft in a direction opposing the changing direction to the target cam shaft phase, but the lock release control is not limited thereto. For example, the motor power supply amount (power supply duty ratio) may be made larger while the power supply direction of the motor 26 is the positive current.

A cooling time information about a relation between the cooling time of the motor device and the result of yes/no of the lock elimination by the lock release control performed after cooling the motor device within the cooling time is stored, and a current cooling time may be variably set based upon the stored cooling time information. Since the time required for lowering a temperature of the motor device has an individual difference, the motor cooling control is performed in a condition corresponding to the individual difference. Therefore, the temperature of the motor device can be sufficiently lowered by the motor cooling control, finally achieving the lock release certainly.

Specially, in a case where the cooling of the motor device is performed by stopping the power supply to the motor 26 following the lock occurrence of the cam shaft 16, the power supply stop time (cooling time) to the motor 26 is stored as a learning value in the memory for backup. At this time, the result of yes/no of the lock release by the lock release control after the cooling is also stored together. In a case where the lock release can be achieved in the power supply stop time indicated at TA1, the power supply stop time at the motor cooling is set to TA1 at the following lock occurrence of the cam shaft 16. In a case where the lock release can not be achieved in the power supply stop time TA1, the power supply stop time at the motor device cooling time is set to TA2 longer than TA1, at the following lock occurrence of the cam shaft 16.

It is determined whether or not the lock state is eliminated in the lock release control (second power supply control) performed after cooling the motor device. When it is determined that the lock state is not eliminated, the cooling of the motor device by the motor cooling control is again performed. Then, after re-cooling, the power supply control for the lock release is performed again. In a case where the lock release can not be achieved even if the lock release control is performed after cooling the motor device, there is a possibility that a temperature of the motor device can not be sufficiently lowered by the motor cooling control before the lock release and the lock release can not be achieved due to lack of the motor torque. Also, there is a possibility that the temperature of the motor device is further increased by supplying power to the motor device in a state where the lock release is not achieved. Therefore in the above construction, the cooling time at the previous cooling may be stored as the cooling time information and the cooling time at the time of re-cooling the motor device may be longer than at the previous cooling, based upon the cooling time information.

In the above embodiment, the power supply direction to the motor 26 is in reverse to the power supply direction at the time of changing the cam shaft phase to the target value to temporarily reverse the cam shaft phase. However, the cam shaft phase may be temporarily changed in a reverse direction by decreasing the motor power supply amount or making the power supply amount to the motor 26 decreased to be zero without changing the power supply direction of the motor 26. In the middle of changing the cam shaft phase, when the cam shaft phase is to be held in the current phase, the holding current is required for holding the phase. Therefore it is possible to change the cam shaft phase in a direction opposing the changing direction to the target value by decreasing the power supply to the motor 26 to less than at present, and the lock release can be achieved by this construction also. In this case, although a certainty of the lock release is lower than in a case of changing the power supply direction to the motor 26 to the reverse direction, it is advantageous in a point where gear rattles between gears due to the reverse rotation of the cam shaft 16 can be suppressed.

The cam shaft phase is temporarily changed in a reverse direction by reversing the power supply direction to the motor 26, or decreasing the motor power supply amount or making the power supply amount to the motor 26 decreased to be zero without changing the power supply direction to the motor 26.

In this structure, at a first lock state occurrence, the lock release is performed by decreasing the motor power supply amount or making the power supply amount to the motor 26 decreased to be zero without changing the power supply direction to the motor 26. At a second lock state occurrence, the lock release is performed by reversing the power supply direction to the motor 26. In this manner, the lock release can be achieved while maintaining a balance between suppression of the gear rattle between gears and the certainty of the lock release. That is, assuming that the lock occurrence is rare in principle, the power supply direction at the lock release time is not changed at first, and is reversed as needed. Therefore the preferable lock release control can be performed, and simultaneously the gear rattle between gears caused by the reverse rotation of the cam shaft 16 can be suppressed.

In the above embodiment, the present invention is applied to an electrically-operated type of variable valve timing device for electrically rotating the intake-side cam shaft 16 via the phase variable mechanism 21 by the motor 26, but the present invention may be applied to a hydraulic variable valve timing device for rotating the intake-side cam shaft 16 by controlling pressures in a hydraulic circuit by an electric pump driven by a motor. In this construction, since the phase variable mechanism 21 as a rotation transmission portion is unnecessary, although the possibility of the lock occurrence depending on smoothness levels of the engaging state between gear teeth of the phase variable mechanism 21 is reduced, there is a possibility that the lock state occurs due to loads generated at the time the cams of the cam shaft push down intake/exhaust valves against urging forces of the valve springs. Therefore, the effect of certainly changing the phase of the cam shaft to a target value can be obtained by applying the present invention to the hydraulic variable valve timing device.

The variable valve timing device 18 is provided in the intake-side cam shaft 16, but the variable valve timing device may be provided in the exhaust-side cam shaft 17. The lock release control and the motor cooling control are performed as described above.

The present invention is applied to the variable valve timing device provided with the phase variable mechanism 21 between the motor 26 and the intake-side cam shaft 16, but as long as the rotational phase of the intake-side cam shaft 16 is variable relative to the crank shaft 12 by a drive of the motor 26, the present invention is not limited to the above construction. For example, the present invention may be applied to a variable valve timing device provided with a link mechanism constructed by arms or a guide plate between the motor 26 and the intake-side cam shaft 16.

What is claimed is:

1. A variable valve timing controller applied to a variable valve timing device provided with a motor device including a motor and a motor drive circuit for supplying power to the motor for a drive, wherein a rotational force generated by driving the motor is transmitted to a cam shaft for an internal combustion engine, and a rotational phase of the cam shaft relative to a crank shaft for the internal combustion engine is changed by the rotational force, comprising:

a first power supply control portion for performing a first power supply control for controlling the rotational phase to a target value by driving the motor by the motor drive circuit;

a lock detecting portion for detecting an occurrence of a lock state where a load for rotating the cam shaft temporarily increases such that the load is greater than the rotational force and a change of the rotational phase stops or substantially stops during a changing of the rotational phase to the target value by the first power supply control portion with the internal combustion engine stopped;

a cooling control portion for cooling the motor device in a case where it is detected that the lock state occurs by the lock detecting portion; and a second power supply control portion for performing a second power supply control for eliminating the lock state by driving the motor by the motor drive circuit after cooling the motor device by the cooling control portion, wherein:

the second power supply control portion is configured to perform, as the second power supply control, 1) a reverse rotational control for temporarily controlling the rotational phase in a direction opposing a changing direction to the target value such that a rotational direction of the cam shaft is reversed from a forward direction to a reverse direction after detection of the lock state, and 2) a subsequent switching of the rotational direction back to the forward direction by temporarily increasing a power supply amount to the motor to a predetermined increasing amount at a start of switching the rotational direction.

2. A variable valve timing controller according to claim 1, wherein:

the cooling control portion is configured to stop the motor power supply by the motor drive circuit, and cool the motor device by heat release in the power supply stop state.

3. A variable valve timing controller according to claim 1, further comprising:

a first temperature detecting portion for detecting a temperature of the motor device at a cooling start time by the cooling control portion, wherein:

the cooling control portion sets a cooling time of the motor device based upon the temperature detected by the first temperature detecting portion.

4. A variable valve timing controller according to claim 1, further comprising:

a second temperature detecting portion for detecting a temperature of the motor device within a cooling performance period by the cooling control means, wherein:

the cooling of the motor device by the cooling control portion is stopped based upon the temperature detected by the second temperature detecting portion.

5. A variable valve timing controller according to claim 1, further comprising:

a storage portion for storing a cooling time information about a relation between a cooling time of the motor device by the cooling control portion and a result of yes/no of lock elimination by the second power supply control performed after cooling the motor device within the cooling time, wherein:

the cooling time of the motor device by the cooling control portion is set based upon the cooling time information stored in the storage portion.

6. A variable valve timing controller according to claim 1, further comprising:

a third power supply control portion for performing a third power supply control for eliminating the lock state by driving the motor by the motor drive circuit before the cooling by the cooling control means when the lock detecting portion detects the lock state occurs; and a lock release determination portion for determining whether the lock state is eliminated by performing the third power supply control, wherein:

the cooling control portion cools the motor device when the lock detecting portion detects that the lock state occurs and the lock release determination portion determines that the lock state is not eliminated.

* * * * *